(12) United States Patent
Birk et al.

(10) Patent No.: US 8,073,638 B2
(45) Date of Patent: Dec. 6, 2011

(54) METHOD FOR DETERMINING THE IGNITABILITY OF FUEL WITH AN UNKNOWN FUEL QUALITY

(75) Inventors: Manfred Birk, Oberriexingen (DE); Michael Scheidt, Stuttgart (DE); Andreas Rupp, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 329 days.

(21) Appl. No.: 12/249,268

(22) Filed: Oct. 10, 2008

(65) Prior Publication Data
US 2009/0105965 A1   Apr. 23, 2009

(30) Foreign Application Priority Data
Oct. 17, 2007   (DE) .......................... 10 2007 049 705

(51) Int. Cl.
*G01N 33/22*   (2006.01)
(52) U.S. Cl. ................ 702/30; 702/22; 702/23; 702/24; 702/25; 702/31; 702/32; 123/295; 123/299; 123/300; 123/304; 123/305; 123/431; 123/531; 123/525; 123/527; 123/528; 123/472; 123/478; 123/490
(58) Field of Classification Search .............. 702/22–25, 702/30–32; 123/295, 299, 300, 304, 305, 123/431, 531, 525, 527, 528, 472, 478, 490
See application file for complete search history.

(56) References Cited

U.S. PATENT DOCUMENTS
2004/0200453 A1* 10/2004 Abo et al. ..................... 123/299

FOREIGN PATENT DOCUMENTS
JP   2008-274905   * 11/2008

* cited by examiner

*Primary Examiner* — Sujoy Kundu
(74) *Attorney, Agent, or Firm* — Merchant & Gould, P.C.

(57) ABSTRACT

The invention relates to a method for determining the ignitability of fuel, particularly of diesel, biodiesel, gas-to-liquid or biomass-to-liquid fuel, with an unknown fuel quality for an internal combustion engine. Provision is made for the density of the fuel to be ascertained and for the ignitability to be derived from this.

10 Claims, 2 Drawing Sheets

METHOD FOR DETERMINING THE IGNITABILITY OF FUEL WITH AN UNKNOWN FUEL QUALITY

The invention relates to a method for determining the ignitability of fuel, particularly diesel, biodiesel, gas-to-liquid (GTL) or biomass-to-liquid (BTL) fuel, with an unknown fuel quality, which is specified for use in an internal combustion engine.

TECHNICAL FIELD

Fuels for diesel engines of motor vehicles, such as diesel, biodiesel or gas-to-liquid fuel, i.e. liquid fuel obtained from natural gas, partially have very different fuel qualities. Particularly the ignitability of the fuel, which is very important for the combustion in the cylinders of diesel engines and is usually expressed as the cetane index CCI or the cetane number, can vary considerably for different fuels, a bandwidth of the cetane index being definitely possible between values of 38 for diesel fuel in the USA and approximately 70 for GTL fuel.

BACKGROUND

In light of such a large range of fuel qualities, it is no longer possible with regard to the operation of an internal combustion engine at every engine operating point to find suitable parameters for the open-loop or closed-loop control of the combustion in the cylinders, as for example the quantity of injected fuel, the point in time of pilot and main injections, the rail pressure of a common rail fuel injection system, the quantity of fresh air supplied to the cylinders, the supercharging pressure in supercharged internal combustion engines, the throttle valve position etc., with which good results with regard to emissions and drivability of the motor vehicle can be obtained for all of the fuel qualities.

That is why practical methods are needed, with which the ignitability of the fuels used in the operation of the internal combustion engine, respectively the motor vehicle, can be ascertained with sufficient accuracy.

Such methods have already been proposed, wherein the quality and particularly the ignitability of the fuel being used is derived from the progression of the cylinder pressure. What is considered a disadvantage in these methods is, however, that the installation of an additional cylinder pressure sensor is required and that the measurement of the cylinder pressure can only be performed in a special operating mode of the internal combustion engine.

Based on this fact, the task underlying the invention is to improve a method of the kind mentioned at the beginning of the application to such an extent that the determination of the ignitability of fuel with an unknown fuel quality can be performed during the normal operation of the internal combustion engine and without necessitating the use of additional sensors.

SUMMARY

The task is thereby solved according to the invention, in that the density of the fuel is ascertained, and the ignitability of the fuel is derived from this.

The idea behind the invention is that the cetane index, which serves as a measurement for the ignitability of fuels for diesel engines, can according to ASTN D976 be determined by empirical formulas, into which only the distillation range, respectively a corrected average boiling temperature of the fuel, besides the density $\rho$ of the fuel at a specified temperature goes. Because the distillation range, respectively the corrected average boiling temperature of the fuel, for all of the fuels used in diesel engines can be assumed as approximately constant, a definite relationship consequently ensues between the density $\rho$ of the fuel and the cetane index CCI, so that this can be calculated when the density $\rho$ is known.

While a determination of the fuel density from the mass and the volume of the fuel contained in a fuel tank of the internal combustion engine is not possible without additional sensors and in addition is largely inaccurate due to the fluctuating fluid levels, the mass as well as the volume of the fuel injected into a cylinder of the internal combustion engine can be obtained from information or data, which are required for the closed-loop or open-loop control of the combustion in the cylinders of modern motor vehicle engines and consequently are as a rule already provided by indicators, sensors or probes present in the internal combustion engine, respectively the motor vehicle.

Provision is, for example, made in a preferred configuration of the invention for the mass of the fuel, which is delivered into a cylinder of the internal combustion engine during an injection, to be determined from the mass of the fresh air delivered into this cylinder for combustion and the combustion-air ratio (air ratio) $\lambda$ in the combustion exhaust gas discharged from the cylinder, in that the combustion-air ratio $\lambda$ is measured during a time period, wherein the injected fuel quantity and the quantity of fresh air being supplied are maintained at a constant level.

In internal combustion engines with a common rail fuel injection system, the volume of the fuel delivered into a cylinder of the internal combustion engine during one injection does not have to be ascertained with sensors but can be calculated according to a further preferred configuration of the invention from the rail pressure as well as from the duration of the activation of the injectors of the fuel injection system. This results from the fact that the volume of the injected fuel is established by these variables. The backpressure in the cylinder and the temperature of the fuel measured by a temperature sensor of the fuel injection system are, however, thereby preferably taken into account because the accuracy of the calculation of the injected fuel volume from the rail pressure as well as from the duration of the activation of the injectors can be improved in this way.

Because in diesel internal combustion engines, the mass of the fresh air delivered into the cylinder, which is measured by an air mass sensor of the internal combustion engine, and the combustion-air ratio, which is measured by a lambda probe in the exhaust gas tract of the internal combustion engine, are normally transferred in the form of sensor signals with data to an engine control unit of the internal combustion engine for evaluation, it is particularly advantageous if at least the determination of the mass of the fuel injected into the cylinder of the internal combustion engine is performed on the basis of these data. Because the determination of the fuel volume delivered into a cylinder of the internal combustion engine for one injection takes place mathematically, it can, however, likewise be advantageously performed by a processor of the engine control unit of the internal combustion engine just like the ascertainment of the density of the fuel from mass and volume as well as the mathematical derivation of the ignitability, respectively of a cetane index, from the calculated density of the fuel.

An absolute value for the mass and/or for the density of the fuel is preferably ascertained on the basis of models in the engine control unit. A reference value for the mass and/or for the density of the injected fuel can, however, alternatively or additionally be determined for a fuel with a known fuel quality and can be compared in predetermined time intervals with the mass and/or the density of the injected fuel, which were ascertained for the same fuel. This is done in order that allowance is made for deviations due to deterioration when ascertaining the mass of the fuel and/or the fresh air mass delivered into the cylinder.

Because rapid changes in the density of the fuel can suggest the use of a fuel with a different fuel quality, the density of the fuel is advantageously ascertained before a filling of the fuel tank (fueling). In so doing, a filling of the tank (fueling) can be suggested from a change in the fill level of the fuel in a fuel tank, an opening of a fuel filler flap and/or a calculation of the fuel consumption of the internal combustion engine.

If the occasion arises that the density of the fuel being used and thereby the ignitability of the fuel, which was ascertained via the density, have changed, a portion of the significant parameters designated for the open-loop or the closed-loop control of the combustion in the internal combustion engine, such as air mass, initiation of activation and rail pressure, or nominal value characteristic diagrams of these parameters is changed in such a way than an optimal combustion once again takes place.

BRIEF DESCRIPTION OF THE DRAWING

In the following, the invention is explained in detail using one of the examples of embodiment depicted in the drawing. The following are shown.

DETAILED DESCRIPTION

Figure 1:
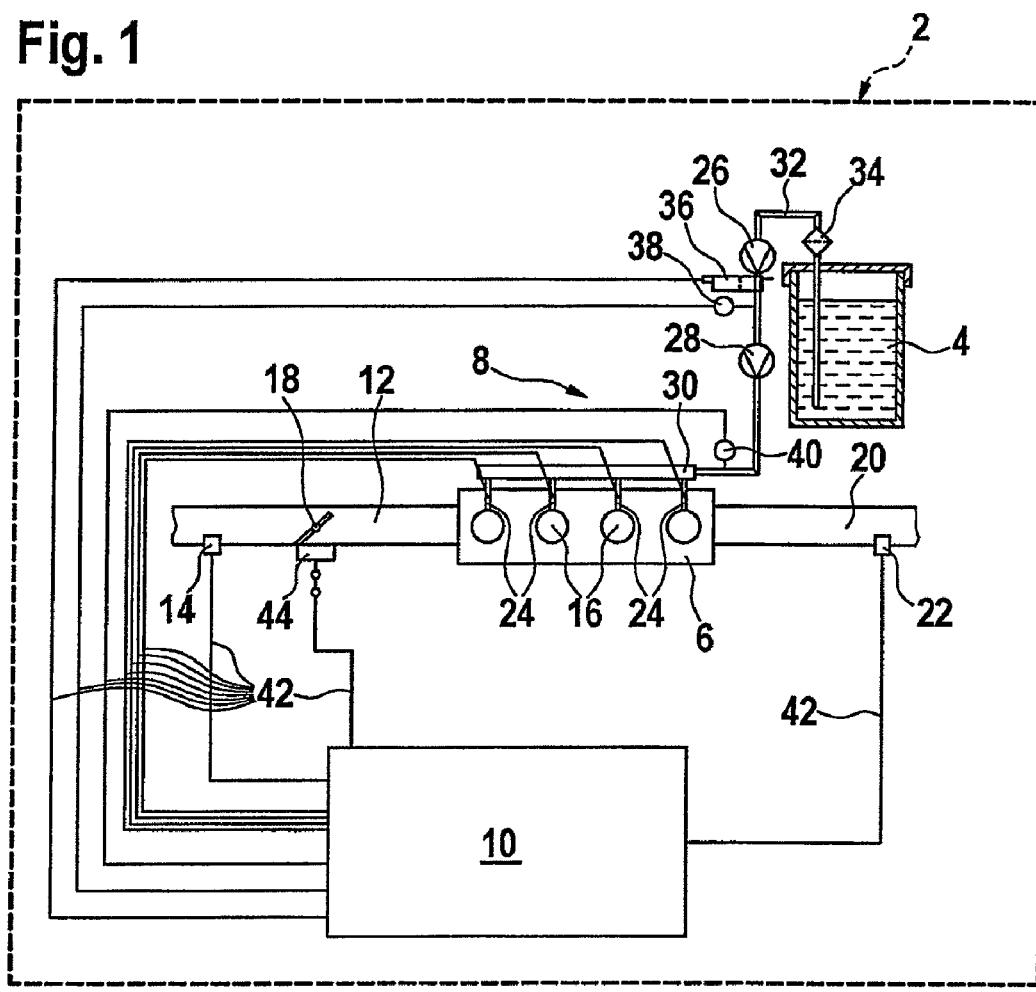
FIG. 1 is a schematic view of parts of a motor vehicle with a diesel engine.

The motor vehicle 2 schematically depicted in FIG. 1 of the drawing has a diesel engine 6, which is selectively supplied with diesel, biodiesel or gas-to-liquid (GTL) fuel from a fuel tank 4, with a common rail fuel injection system 8, which is activated by an engine control unit 10.

The diesel engine 6 has in a known manner an intake tract 12 with an air mass flow meter 14 for measuring the fresh air mass delivered into the cylinders 16 of the engine 6 and a throttle valve 18 for controlling the fresh air supply as well as an exhaust gas tract 20 with a lambda probe 22 for measuring the combustion-air ratio (air ratio λ) of the combustion gases discharged from the cylinders 16.

The fuel injection system 8 comprises likewise in a known manner a plurality of injectors or injection valves 24, which are supplied with fuel from the fuel tank 4 by a fuel pump 26 and a high pressure piston pump 28 via a common manifold (rail) 30. The fuel line 32 leading from the fuel tank 4 to the fuel distributor rail 30 comprises besides a fuel filter 34 and both pumps 26, 28 additionally a pressure control valve 36 for controlling the fuel pressure before the high pressure pump 28, a temperature sensor 38 for measuring the fuel temperature as well as a pressure sensor 40 for measuring the pressure in the fuel distributor rail 30 (rail pressure).

The engine control unit 10 is connected via signal lines 42 to the sensors 38, 40 and the injectors 24 of the fuel injection system 8, to the air mass flow meter 14 and an actuator 44 for adjusting the throttle valve 18, to the lambda probe 22 as well as to further, unspecified sensors and actuators, as, for example, a tachometer, respectively an accelerator pedal of the motor vehicle 2.

Sensor signals with information or data are evaluated in the engine control unit 10. Said data comprise among other things the fresh air mass delivered into the cylinders 16, which is measured by the air mass flow meter 14, the combustion-air ratio measured by the lambda probe 22, the rail pressure measured by the pressure sensor 40 as well as the fuel temperature measured by the temperature sensor 38. The evaluated information or data together with an actuating signal from the accelerator pedal as well as with open-loop or closed-loop variables deposited in characteristic diagrams provide for the open-loop, respectively closed-loop, control of diverse parameters, which are significant for the combustion of fuel in the cylinders 16. These parameters can comprise among other things the quantity of the fuel delivered into the cylinders 16 during one or a plurality of pilot injections, the point in time of the initiation of the pilot injection, respectively the pilot injections, the temporal interval between the pilot injections, respectively between a pilot injection, and the main injection, the height of the rail pressure supplied by the high pressure pump 28, the position of the throttle valve 18, the swirl of the injected fuel, the exhaust gas recirculation rate, i.e. the quantity of the exhaust gas recirculated out of the exhaust gas tract 20 into the cylinders, as well as the supercharging pressure of a super charger in the case of supercharged diesel engines.

A portion of the information, which is transferred from the measuring devices, probes, respectively sensors 14, 22, 38, 40, to the engine control unit 10, is furthermore used in the normal driving operation of the motor vehicle 2 in order to ascertain the ignitability of the fuel delivered from the fuel tank 4 into the fuel injection system 8 without necessitating the use of additional sensors or a special operating mode. Said ignitability can undergo considerable changes particularly when a change in the type of fuel is made, for example from diesel fuel to biodiesel fuel or vice versa. The ascertained ignitability of the fuel, which represents a measurement for its fuel quality and is usually expressed as the cetane index CCI or cetane number, is then used by the engine control unit 10 in order if required, i.e. when a change in the ascertained ignitability occurs, to appropriately change a portion of the previously mentioned parameters, respectively their nominal value characteristic diagrams, which are significant for the combustion in the cylinders, so that once again an optimal combustion is achieved.

Because the cetane index can on the one hand be determined with the aid of empirical formulas, for example according to an especially simple formula:

$$CCI=454.74-1.641416\epsilon\rho+0.00077474\epsilon\rho^2-0.554\epsilon t50+97.803\log 2(t50)$$

whereby the cetane index CCI besides from being a function of the average boiling temperature t50 of the fuel in ° C., corrected to the ICAO Standard Atmosphere, is only a function of the density ρ of the fuel in kg/m³ at a temperature of 15° C. and because on the other hand, the average boiling temperature t50 for all of the fuels, which are normally used in diesel engines, can be considered approximately as constant, it is possible to calculate the cetane index CCI with a sufficient degree of accuracy solely from the density ρ of the fuel.

Figure 2:
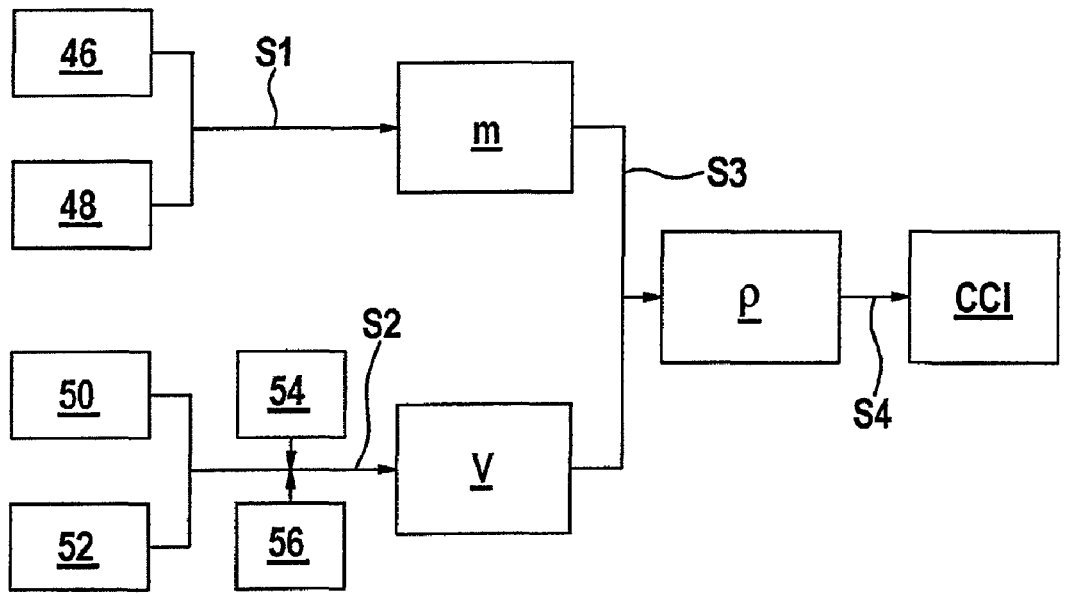
FIG. 2 is a block diagram of a method for determining the ignitability of fuel for the diesel engine according to a first variation.

A method suited for this purpose is schematically depicted in FIG. 2, wherein the density ρ of the fuel is calculated as an absolute value from the quotient of the mass m and the volume V of the fuel delivered during one injection into one of the cylinders 16 of the engine 6.

In the process, the mass m of the injected fuel is determined using a suitable software in the engine control unit 10 in step S1 with the aid of a model calculation constructed for this purpose from the mass of the fresh air 46 delivered for combustion into the cylinder, which is measured by the air mass flow meter 14, and from the combustion-air ratio 48 (air ratio λ) in the combustion exhaust gas being discharged from the cylinder 16; while in step S2, the injected fuel volume V, which is established by the rail pressure, as measured by sensor 40, and by the activation duration 52 of the injectors, is likewise determined with the aid of a model calculation. In order to improve the accuracy of the method, the fuel temperature 54 measured by the sensor 38 as well as the backpressure 56 in the cylinder 16 deposited for the respective operating point of the engine 6 in characteristic diagrams of the engine control unit 10 are additionally taken into account in step S2.

After the density ρ of the injected fuel has been calculated as the quotient of the mass m and the volume V in step S3, the cetane index of the fuel is then calculated in step S4 from this density ρ, for example using the formula stated above.

Because the fuel mass m, which was actually injected, can slowly change at constant activation parameters, as for example rail pressure 50, activation duration 52, fuel temperature 54 and backpressure 56 in the cylinder, as the result of drifts in the fuel injection system 8 over the service life of the engine 6, respectively the motor vehicle 2 just as the air mass 46 measured by the air mass flow meter 14 as a result of a drift of the air mass flow meter 14, it is possible that the absolute value of the density ρ and the cetane index determined from said absolute value can gradually deviate from the actual density ρ, respectively from the actual cetane index CCI, of the fuel.

Figure 3:
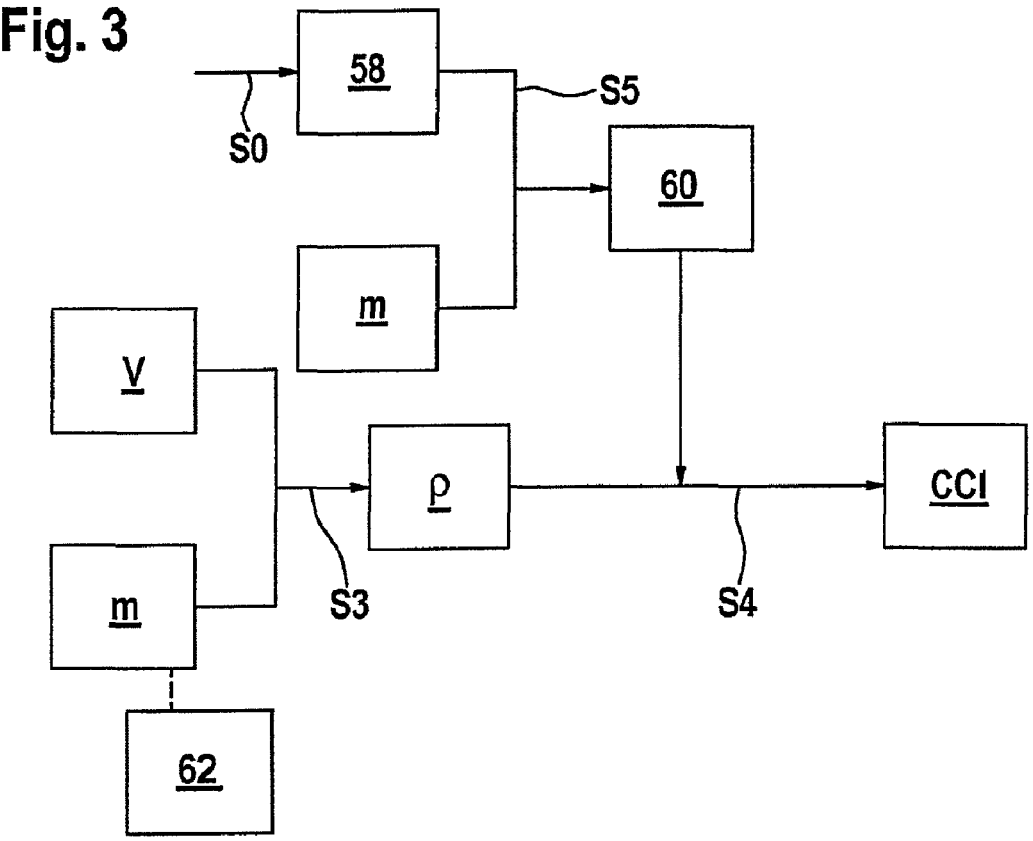
FIG. 3 is a block diagram of a modification of the method from FIG. 2.

In order to compensate for this gradual deviation, respectively in order to take said deviation into account when ascertaining the density ρ, a reference value 58 for the mass m of the injected fuel can be determined in a preceding step S0 for a new motor vehicle with a fuel with a known cetane index in the manner previously described. In step 5 while using the same fuel, this reference value 58 can then be compared with the fuel mass m, which was ascertained (FIG. 2), in predetermined temporal intervals, for example during each service inspection of the motor vehicle 2. This is done as shown in FIG. 3 in order to derive a correction value 60 for the calculation of the cetane index CCI. This correction value is then taken into account in step S4.

On the contrary, rapid changes in the cetane index CCI, which was ascertained, suggest rather a change in the density ρ of the fuel, so that the accuracy of the method previously described can thereby also alternatively or additionally be improved, in that the determination of the fuel mass m is correlated with the fuelings of the tank 62. Said change in the density ρ of the fuel can, for example, be suggested from a large change in the fill level of the fuel in the fuel tank 4, from the opening of a fuel filler flap or from the calculated fuel consumption.

As a further advantage of the method described, the fuel density ρ ascertained for the determination of the ignitability can also furthermore be taken into account as a multiplicative factor during the conversion of the fuel quantity to be fed into the injectors 24 into the activation duration 52 of the injectors 24.

The invention claimed is:

1. A method of determining the ignitability of a fuel of an unknown quality for use in an internal combustion engine, wherein the fuel is particularly a diesel fuel, a biodiesel fuel, a gas-to-liquid fuel, or a biomass-to-liquid fuel, the method comprising:
on a control unit connected to the internal combustion engine,
determining a mass of fuel injected into at least one of a plurality of cylinders of the internal combustion engine from a mass of fresh air delivered for combustion into the at least one cylinder and from a combustion-air ratio in a combustion exhaust gas discharged from the at least one cylinder;
determining a volume of the fuel injected into the at least one cylinder;
calculating a density of the fuel from the determined mass of the injected fuel and the determined volume of the fuel injected; and
deriving the ignitability of the fuel from the fuel density.

2. A method according to claim 1, further comprising calculating the volume of fuel injected into the at least one cylinder from a rail pressure of a common rail fuel injection apparatus and from a duration of an activation of a plurality of injectors of the fuel injection apparatus.

3. A method according to claim 2, further comprising accounting for a backpressure in the at least one cylinder and/or a temperature of the injected fuel when calculating the volume of fuel injected into the at least one cylinder.

4. A method according to claim 3, further comprising measuring the temperature of the injected fuel with a temperature sensor of the fuel injection apparatus.

5. A method according to claim 1, further comprising ascertaining an absolute value for the mass and/or for the density of the fuel on a basis of one or more models.

6. A method according to claim 1, further comprising:
determining a reference value for the mass and/or for the density of the injected fuel from a fuel with a known fuel quality; and
comparing the reference value with the ascertained mass and/or the density of the injected fuel, wherein the comparison is made at a predetermined temporal interval.

7. A method according to claim 1, further comprising ascertaining the density of the fuel either prior to or after a filling of a fuel tank or both.

8. A method according to claim 7, further comprising deriving an occurrence of the filling of the fuel tank from a change in a fill level of the fuel in the fuel tank, an opening of a filler flap and/or a calculated fuel consumption of the internal combustion engine.

9. A method according to claim 1, further comprising changing as a function of the ascertained fuel ignitability one or more parameters for the open-loop and/or closed-loop control of fuel combustion in a plurality of cylinders of the internal combustion engine or a nominal value characteristic diagram of the one or more parameters.

10. A method according to claim 9, wherein the one or more parameters comprise of an air mass, an initiation of activation and a rail pressure.

\* \* \* \* \*